Patented Nov. 8, 1938

2,136,028

UNITED STATES PATENT OFFICE 2,136,028

PROCESS FOR PRODUCING POLYMERIC COMPOUNDS

Robert Dewey Snow, Bartlesville, Okla., assignor to Phillips Petroleum Company, Bartlesville, Okla., a corporation of Delaware No Drawing. Application January 26, 1934, Serial No. 708,522

17 Claims. (Cl. 260—2)

This invention relates to the production of compounds of high molecular weight by the reaction of sulfur dioxide with unsaturated compounds; and more specifically to the provision of means and conditions for carrying out such reactions with a rapidity and yield not hitherto obtainable.

A further object of the invention is to describe means whereby sulfur dioxide may be caused to react with certain olefin hydrocarbons heretofore considered non-reactive, and to the new and useful products produced thereby; all as more fully hereinafter set forth and claimed.

The reaction between some of the simple olefinic hydrocarbons, such as ethylene, propylene, and pseudobutylene (butene-2), and $SO_2$ to form resinous bodies has been described by Matthews and Elder, British Patent 11,635, 1914. In their patent, however, nothing is said regarding the temperature range in which the reaction will take place, but judging from their disclosure they carried out most of their reactions at ordinary room or atmospheric temperatures, except that they state in Example 3: "Amylene (trimethyl ethylene or any of the isomeric amylenes) and liquid $SO_2$ which may conveniently be taken in equal molecular proportions are mixed together in a closed glass vessel and the combination accelerated either by warming in a water bath at a suitable temperature, say at 50° C., but preferably by exposing to bright sunlight as in the previous examples." Perkins, Can. Pat. 329,043, 1933, describes the reaction of $SO_2$ with diolefins at temperatures near 100° C. When temperature was mentioned at all in past reference in connection with the reaction of $SO_2$ with olefins or diolefins, it has been an elevated temperature.

However, I have found that the reaction of butene-2 with sulfur dioxide, whether promoted by catalysts, sunlight or other source of actinic light, takes place more slowly at 37° C. than at 25° C., and stopped entirely at temperatures of 40° C. and above. In other words, there is a limiting or threshold temperature above which the reaction does not take place. While these threshold temperatures have not been determined for all hydrocarbons, they are known to be higher for propylene and ethylene than for butene-2. This behavior near the threshold temperature is, of course, contrary to the usual experience of chemistry that the reaction rate increases with rising temperature, approximately doubling for a rise of 10° C. Were it a case of the shift of an equilibrium toward the side of decomposition, we should expect that the reaction product already formed in the reacting mixture at lower temperatures would decompose when heated above the threshold temperature, but this is not the case. For example, when one mol of butene-2 and two mols $SO_2$ are exposed to sunlight until 50 percent of the butene-2 is converted to reaction product, and the temperature is then raised to 45° C., the quantity of reaction product remains unchanged over a period of days nor is there any appreciable change in the quantity of reaction product when such a mixture is heated to 100° C.

Contrary to Example 3 of the previously cited Matthews and Elder patent, it has been found that trimethylethylene, unsymmetrical methyl ethyl ethylene, and pentene-2 will undergo no detectable reaction with sulfur dioxide in the temperature range of 20–100° C., either in sunlight or in the presence of catalysts. The same is true of many other unsaturated compounds and their oxides; for example, isobutylene, hexene-2, hexene-3, and cyclohexene. Ethylene oxide and propylene oxide do not undergo the reaction above 30° C.

I have found that the reason why certain of these olefins will not react with sulfur dioxide in the expected manner is that the threshold temperature above which the reaction will not take place lies below those temperatures commonly used, and generally referred to as room temperature, say 20° C. to 30° C. I have reacted, for example, isobutylene, pentene-2, hexene-2, cyclohexene, ethylene oxide and propylene oxide with sulfur dioxide to form products of high molecular weight, at temperatures below +10° C., and in the presence of sunlight, or of catalysts such as silver or lithium nitrate.

I have also found the use of these lower reaction temperatures advantageous for accelerating the reaction of mixtures of olefins containing branched chain, or tertiary olefins. As pointed out elsewhere (application Ser. No. 628,449, Patent No. 2,045,592), small quantities of isobutylene or other tertiary olefines inhibit or slow down the reaction of sulfur dioxide with normally reactive olefins at temperatures of 15 to 40° C. For example, a mixture of 25 percent isobutylene and 75 percent butene-2 in two equivalents of sulfur dioxide, will react very slowly at 20–40° C., only 15 percent of such a mixture being converted into high molecular weight polymer in 20 days of exposure to sunlight. A mixture of pure butene-2 and sulfur dioxide reacted completely in less than one day under similar conditions. However, I have found that mixtures of olefins containing considerable quantities of tertiary olefins react quite readily with sulfur dioxide at lower temperatures. For example, mixtures of 50 percent butene-2 and 50 percent isobutylene, or 25 percent butene-2 and 75 percent isobutylene react rapidly at 0° C. in the sunlight, or in the presence of catalysts such as silver nitrate.

In the commercial scale production of the sulfur dioxide resins, it would be highly desirable to use as raw materials such mixtures of olefin, paraffin and cyclic hydrocarbons as are obtained as products of oil cracking, carbonization of coal, or equilibrium dehydrogenation of paraffin hydrocarbons. Typical propane-propylene fractions of cracking still vapors will contain from 20 to 40 percent propylene. Butane-butene fractions from the same source usually contain from 30 to 80 percent of butenes. Products obtainable by the catalytic dehydrogenation of the lower paraffins, such as n-butane and n-pentane, will contain 10 to 30 percent of olefins, depending upon the temperature and pressure conditions of dehydrogenation. Furthermore, the dehydrogenated n-pentane will contain important quantities of pentene-2, which does not react with $SO_2$ at, or above, room temperature. The isolation or concentration of olefins from such mixtures by ordinary methods such as fractional distillation is very difficult and costly; hence it would be highly desirable to react the $SO_2$ directly with the olefins in such mixtures, without first concentrating or isolating the olefins. However, the large quantities of paraffins present tend to slow down the reaction by dilution and by decreasing the solubility of most catalysts in the reaction mixture. The result is that with such mixtures at, or above, room temperature the reaction is usually slow.

I have found that the use of the low temperatures has a further beneficial effect in the case of mixtures containing large proportions of saturated hydrocarbons, or other diluent materials, in that the reaction mixture with $SO_2$ tends to form two phases, the lower of which is rich in $SO_2$ which tends to selectively extract olefins from the mixture. Resin is generally formed more rapidly under such conditions than at temperatures at which only one liquid phase exists. This is important in the reaction of such products as fractions of cracking still vapors, partially dehydrogenated paraffin hydrocarbons, etc. Also, the fractions of cracking still vapors and dehydrogenated paraffins containing compounds of five carbon atoms or more contain considerable proportions of 2-olefins which will react with $SO_2$ only at low temperatures. Consequently the use of low temperatures increases both the reaction rate and the quantity of resin from such mixtures. Of course, the reaction is virtually arrested at extremely low temperatures, but temperatures down to 30° below zero, centigrade, may on some occasions be found useful.

Inasmuch as pentene-2, hexene-2, and probably also the higher 2-olefins will react with $SO_2$ at low temperatures, products obtained by dehydrating the corresponding secondary alcohols with 60–65 percent $H_2SO_4$ or by extracting olefins from cracked products with concentrated $H_2SO_4$, diluting the acid to 60–65 percent strength and generating the 2-olefins by heating can now be converted into resins.

Products obtained by reacting the $SO_2$ with the unsaturated compound at low temperatures are generally of better quality than those obtained from the same material at ordinary or higher temperatures.

*Example I.*—One mol of isobutylene, two mols of $SO_2$, and one cc. of saturated alcoholic $AgNO_3$ solution are thoroughly mixed in a pressure vessel and are allowed to stand 24 hours at 0° C. After removing the excess $SO_2$ the product is obtained as a white brittle solid, which is practically insoluble in $SO_2$.

*Example II.*—One half mol of isobutylene, one half mol of butene-2 and two mols of $SO_2$ are sealed in a glass tube and are exposed to sunlight at 0° C. The reaction is practically complete in two days.

*Example III.*—Three pounds of a butane-butene fraction of cracking still gases, two pounds of $SO_2$, and 30 cc. of saturated alcoholic $AgNO_3$ are mixed and allowed to stand in a pressure vessel surrounded by a bath of ice water or cold brine. The solid resin is obtained by evaporating the unchanged hydrocarbons and $SO_2$.

I do not limit my claims to the proportion of $SO_2$, the nature of quantity of catalyst or the source of light specified in the above examples.

What I claim and desire to secure by Letters Patent is:

1. The process of producing polymeric products of high molecular weight which consists in reacting sulfur dioxide with mono-olefins at temperatures below +15° C.

2. In a process of producing polymeric products of high molecular weight from sulfur dioxide and mono-olefins, the improvement which consists in reacting the sulfur dioxide with the said mono-olefins at temperatures between −30° C. and +15° C.

3. The process of producing polymeric compounds of sulfur dioxide and unsaturated hydrocarbons of the group consisting of; isobutylene, pentene-2, hexene-2, and cyclohexene, which consists in reacting any of the said hydrocarbons with sulfur dioxide at temperatures between −30° C. and +15° C.

4. The process of producing polymeric products of high molecular weight, which consists in reacting pentene-2 with sulfur dioxide.

5. In a process of manufacturing polymeric compounds of sulfur dioxide and mono-olefins, the improvement which consists in, reacting the mono-olefins with sulfur dioxide in the presence of catalysts and in the dark, at temperatures between −30° C. and +15° C.

6. In a process of manufacturing polymeric compounds of sulfur dioxide and mono-olefins, the improvement which consists in, conducting the reaction at temperatures below +15° C. but above those temperatures at which the reaction is virtually arrested.

7. A process of producing polymeric products of high molecular weight, which consists in reacting sulfur dioxide with a mixture containing mono-olefin and paraffin hydrocarbons substantially all of which contain the same number of carbon atoms per molecule, at temperatures below +15° C.

8. The process of producing polymeric products of high molecular weight, which consists in reacting sulfur dioxide with those fractions of hydrocarbon pyrolysis products containing mono-olefin hydrocarbons of from three to six carbon atoms to the molecule, at temperatures between −30° C. and +15° C., in the presence of a catalyst.

9. A high molecular weight polymeric compound consisting of sulfur dioxide and a hydrocarbon of the group consisting of; isobutylene, pentene-2, hexene-2, and cyclohexene.

10. The process of manufacturing polymeric compounds of high molecular weight from the gases and volatile liquids produced by the pyrolysis of hydrocarbons, which consists in reacting suitable fractions of such gases and volatile liquids containing mono-olefins without separation of their saturated aliphatic constituents, with sulfur dioxide at temperatures below 15° C.

11. The process of producing heteropolymeric compounds of high molecular weight, which consists in reacting sulfur dioxide with a 2 (beta) mono-olefin at temperatures below +15° C.

12. In the process of producing polymeric compounds of high molecular weight from sulfur dioxide and mono-olefins having an upper threshold temperature substantially below room temperature, the improvement which consists in cooling the mixture to, and carrying out the reaction at, a temperature substantially below the said threshold temperature.

13. The process of producing polymeric products of high molecular weight, which consists in reacting isobutylene with sulfur dioxide.

14. The process of producing polymeric products of high molecular weight, which consists in reacting hexene-2 with sulfur dioxide.

15. The process of producing polymeric products of high molecular weight, which consists in reacting isobutylene with sulfur dioxide at a temperature of about 0° C.

16. The process of producing polymeric compounds of high molecular weight, which consists in reacting pentene-2 with sulfur dioxide at temperatures between —30° C. and 15° C.

17. The process of producing polymeric compounds of high molecular weight, which consists in reacting hexene-2 with sulfur dioxide at temperatures between —30° C. and 15° C.

ROBERT DEWEY SNOW.